US011365660B2

(12) United States Patent
Armitage et al.

(10) Patent No.: US 11,365,660 B2
(45) Date of Patent: Jun. 21, 2022

(54) NOX ADSORBER CATALYST

(71) Applicant: Johnson Matthey Public Limited Company, London (GB)

(72) Inventors: Andrew Armitage, Royston (GB);
Desiree Duran Martin, Reading (GB);
Rebecca Maksymowicz, Royston (GB);
Paul James Millington, Reading (GB);
Paul Richard Phillips, Royston (GB);
Raj Rao Rajaram, Reading (GB);
Stuart David Reid, Royston (GB);
Daniel Swallow, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/618,625

(22) Filed: Jun. 9, 2017

(65) Prior Publication Data
US 2017/0356317 A1 Dec. 14, 2017

(30) Foreign Application Priority Data

Jun. 10, 2016 (GB) ..................................... 1610160
Mar. 28, 2017 (GB) ..................................... 1704901

(51) Int. Cl.
*F01N 3/08* (2006.01)
*B01D 53/94* (2006.01)
*B01J 23/63* (2006.01)
*B01J 35/04* (2006.01)
*B01J 37/00* (2006.01)
*B01J 37/08* (2006.01)
*F01N 3/035* (2006.01)
*F01N 3/10* (2006.01)
*F01N 3/20* (2006.01)
*B01J 37/02* (2006.01)
*B01J 20/02* (2006.01)
*B01J 20/32* (2006.01)
(Continued)

(52) U.S. Cl.
CPC ....... *F01N 3/0842* (2013.01); *B01D 53/9418* (2013.01); *B01J 20/0207* (2013.01); *B01J 20/0225* (2013.01); *B01J 20/06* (2013.01); *B01J 20/08* (2013.01); *B01J 20/28042* (2013.01); *B01J 20/3085* (2013.01); *B01J 20/3204* (2013.01); *B01J 20/3236* (2013.01); *B01J 23/005* (2013.01); *B01J 23/63* (2013.01); *B01J 37/0045* (2013.01); *B01J 37/0201* (2013.01); *B01J 37/0203* (2013.01); *B01J 37/0234* (2013.01); *B01J 37/08* (2013.01); *F01N 3/0814* (2013.01); *F01N 3/101* (2013.01); *F01N 3/2066* (2013.01); *B01D 53/9422* (2013.01); *B01D 53/9454* (2013.01); *B01D 53/9459* (2013.01); *B01D 2255/1021* (2013.01); *B01D 2255/1023* (2013.01); *B01D 2255/2063* (2013.01); *B01D 2255/2065* (2013.01); *B01D 2255/405* (2013.01); *B01D 2255/902* (2013.01); *B01D 2255/91* (2013.01); *B01D 2255/915* (2013.01); *B01D 2255/9155* (2013.01); *B01D 2258/012* (2013.01); *B01J 35/04* (2013.01); *B01J 37/0244* (2013.01); *B01J 37/0248* (2013.01); *B01J 2523/00* (2013.01); *F01N 3/035* (2013.01); *F01N 2370/02* (2013.01); *F01N 2510/06* (2013.01); *F01N 2510/0684* (2013.01); *F01N 2570/14* (2013.01); *Y02T 10/12* (2013.01)

(58) Field of Classification Search
CPC ............ B01D 53/9418; B01D 53/9422; B01D 53/9454; B01D 53/9459; B01D 2255/1021; B01D 2255/1023; B01D 2255/2063; B01D 2255/2065; B01D 2255/405; B01D 2255/902; B01D 2255/91; B01D 2255/915; B01D 2255/9155; B01D 2258/012; B01J 20/0207; B01J 20/0225; B01J 20/06; B01J 20/08; B01J 20/28042; B01J 20/3085; B01J 20/3204; B01J 20/3236; B01J 23/005; B01J 23/63; B01J 2523/00; B01J 2523/22; B01J 2523/31; B01J 2523/3706; B01J 2523/3712; B01J 2523/824; B01J 2523/828; B01J 35/04; B01J 37/0045; B01J 37/0201; B01J 37/0203; B01J 37/0234; B01J 37/0244; B01J 37/0248; B01J 37/08; F01N 2370/02; F01N 2510/06; F01N 2510/0684; F01N 2570/14; F01N 3/035; F01N 3/0814; F01N 3/0842; F01N 3/101; F01N 3/2066; Y02T 10/22; Y02T 10/24
See application file for complete search history.

(56) References Cited

U.S. PATENT DOCUMENTS 5,001,103 A * 3/1991 Koberstein ............ B01J 23/892
502/262
5,656,244 A 8/1997 Cole
(Continued)

FOREIGN PATENT DOCUMENTS

DE 102013218234 A1 * 3/2015 ........... F01N 3/0807
EP 1027919 A2 8/2000
(Continued)

*Primary Examiner* — Audrey B. Walter

(57) ABSTRACT

A $NO_x$ adsorber catalyst and its use in an emission treatment system for internal combustion engines, is disclosed. The $NO_x$ adsorber catalyst comprises a first layer consisting essentially of a support material, one or more platinum group metals disposed on the support material, and a $NO_x$ storage material.

20 Claims, No Drawings

(51) Int. Cl.
*B01J 20/08* (2006.01)
*B01J 20/06* (2006.01)
*B01J 20/30* (2006.01)
*B01J 20/28* (2006.01)
*B01J 23/00* (2006.01)

(56) References Cited

U.S. PATENT DOCUMENTS

| | | |
|---|---|---|
| 5,800,793 A | 9/1998 | Cole |
| 6,468,484 B1 | 10/2002 | Dou et al. |
| 2003/0125202 A1 | 7/2003 | Ruwisch et al. |
| 2004/0042939 A1 | 3/2004 | Rajaram et al. |
| 2006/0117736 A1 | 6/2006 | Twigg |
| 2007/0089403 A1 | 4/2007 | Pfeifer et al. |
| 2009/0084090 A1 | 4/2009 | Nakatsuji et al. |
| 2010/0111789 A1 | 5/2010 | Fajardie et al. |
| 2012/0055414 A1 | 3/2012 | Hilgendorff |
| 2012/0214663 A1 | 8/2012 | Chigapov et al. |
| 2013/0156668 A1 | 6/2013 | Spurk et al. |
| 2013/0189172 A1 | 7/2013 | Spurk et al. |
| 2013/0236380 A1* | 9/2013 | Golden ............... B01J 37/0036 423/213.2 |
| 2014/0301907 A1 | 10/2014 | Sahara |
| 2014/0322113 A1 | 10/2014 | Blakeman et al. |
| 2015/0165418 A1 | 6/2015 | Kearl et al. |
| 2015/0202600 A1* | 7/2015 | Chiffey ............... F01N 3/103 422/171 |
| 2016/0222901 A1* | 8/2016 | Adam ............... F01N 3/0807 |

FOREIGN PATENT DOCUMENTS

| | | |
|---|---|---|
| EP | 1249266 A1 | 10/2002 |
| EP | 1990081 A2 | 11/2008 |
| EP | 2481473 A2 | 8/2012 |
| WO | 2004076829 A1 | 9/2004 |
| WO | 2008047170 A1 | 4/2008 |
| WO | 2011154913 A1 | 12/2011 |
| WO | 2012029050 A1 | 3/2012 |

* cited by examiner

NOX ADSORBER CATALYST

CROSS-REFERENCE TO RELATED APPLICATIONS

This U.S. non-provisional patent application claims priority benefit of GB Patent Applications 1610160.2, filed Jun. 10, 2016, and 1704901.6, filed Mar. 28, 2017, the disclosures of which are incorporated herein by reference in their entirety for all purposes

FIELD OF THE INVENTION

The invention relates to a $NO_x$ adsorber catalyst, a method of making a $NO_x$ storage material, and emission systems for internal combustion engines comprising the $NO_x$ adsorber catalyst.

BACKGROUND OF THE INVENTION

Internal combustion engines produce exhaust gases containing a variety of pollutants, including nitrogen oxides ("$NO_x$"), carbon monoxide, and uncombusted hydrocarbons, which are the subject of governmental legislation. Increasingly stringent national and regional legislation has lowered the amount of pollutants that can be emitted from such diesel or gasoline engines. Emission control systems are widely utilized to reduce the amount of these pollutants emitted to atmosphere, and typically achieve very high efficiencies once they reach their operating temperature (typically, 200° C. and higher). However, these systems are relatively inefficient below their operating temperature (the "cold start" period).

One exhaust gas treatment component utilized to clean exhaust gas is the $NO_x$ adsorber catalyst (or "$NO_x$ trap"). $NO_x$ adsorber catalysts are devices that adsorb $NO_x$ under lean exhaust conditions, release the adsorbed $NO_x$ under rich conditions, and reduce the released $NO_x$ to form $N_2$. A $NO_x$ adsorber catalyst typically includes a $NO_x$ adsorbent for the storage of $NO_x$ and an oxidation/reduction catalyst.

The $NO_x$ adsorbent component is typically an alkaline earth metal, an alkali metal, a rare earth metal, or combinations thereof. These metals are typically found in the form of oxides. The oxidation/reduction catalyst is typically one or more noble metals, preferably platinum, palladium, and/or rhodium. Typically, platinum is included to perform the oxidation function and rhodium is included to perform the reduction function. The oxidation/reduction catalyst and the $NO_x$ adsorbent are typically loaded on a support material such as an inorganic oxide for use in the exhaust system.

The $NO_x$ adsorber catalyst performs three functions. First, nitric oxide reacts with oxygen to produce $NO_2$ in the presence of the oxidation catalyst. Second, the $NO_2$ is adsorbed by the $NO_x$ adsorbent in the form of an inorganic nitrate (for example, BaO or $BaCO_3$ is converted to $Ba(NO_3)_2$ on the $NO_x$ adsorbent). Lastly, when the engine runs under rich conditions, the stored inorganic nitrates decompose to form NO or $NO_2$ which are then reduced to form $N_2$ by reaction with carbon monoxide, hydrogen and/or hydrocarbons (or via $NH_x$ or NCO intermediates) in the presence of the reduction catalyst. Typically, the nitrogen oxides are converted to nitrogen, carbon dioxide and water in the presence of heat, carbon monoxide and hydrocarbons in the exhaust stream.

Typically, $NO_x$ adsorbent materials consist of inorganic oxides such as alumina, silica, ceria, zirconia, titania, or mixed oxides which are coated with at least one platinum group metal. PCT Intl. Appl. WO 2008/047170 discloses a system wherein $NO_x$ from a lean exhaust gas is adsorbed at temperatures below 200° C. and is subsequently thermally desorbed above 200° C. The $NO_x$ adsorbent is taught to consist of palladium and a cerium oxide or a mixed oxide or composite oxide containing cerium and at least one other transition metal.

PCT Intl. Appl. WO 2004/076829 discloses an exhaust-gas purification system which includes a $NO_x$ storage catalyst arranged upstream of an SCR catalyst. The $NO_x$ storage catalyst includes at least one alkali, alkaline earth, or rare earth metal which is coated or activated with at least one platinum group metal (Pt, Pd, Rh, or Ir). A particularly preferred $NO_x$ storage catalyst is taught to include cerium oxide coated with platinum and additionally platinum as an oxidizing catalyst on a support based on aluminium oxide. EP 1027919 discloses a $NO_x$ adsorbent material that comprises a porous support material, such as alumina, zeolite, zirconia, titania, and/or lanthana, and at least 0.1 wt % precious metal (Pt, Pd, and/or Rh). Platinum carried on alumina is exemplified.

In addition, U.S. Pat. Nos. 5,656,244 and 5,800,793 describe systems combining a $NO_x$ storage/release catalyst with a three way catalyst. The $NO_x$ adsorbent is taught to comprise oxides of chromium, copper, nickel, manganese, molybdenum, or cobalt, in addition to other metals, which are supported on alumina, mullite, cordierite, or silicon carbide.

At low temperatures (typically below about 200° C.), the $NO_x$ storage function of these catalysts is inefficient and continues to be an area of catalyst development in need of improvement. It is also desirable for catalysts to be developed that have little or no $NO_x$ storage properties at greater than a specific temperature, to allow control of when $NO_x$ is released for subsequent conversion by, for example, a further downstream catalyst. The deactivation of $NO_x$ adsorber catalysts by sulfur, which can be present in fuels or engine lubricating oil, is also a problem, particularly under lower temperature conditions at which it may be challenging to thermally desulfate the catalyst.

As with any automotive system and process, it is desirable to attain still further improvements in exhaust gas treatment systems. We have discovered a new $NO_x$ adsorber catalyst with improved low temperature $NO_x$ storage characteristics, improved $NO_x$ release properties, and improved desulfation properties.

SUMMARY OF THE INVENTION

In a first aspect of the invention there is provided a $NO_x$ adsorber catalyst for treating emissions from a lean burn engine, said $NO_x$ adsorber catalyst comprising a first layer, said first layer consisting essentially of:
  a support material;
  one or more platinum group metals disposed on the support material;
  and a $NO_x$ storage material;
  wherein the support material comprises alumina or a mixed oxide comprising alumina;
  the one or more platinum group metals consists of a mixture or alloy of platinum and palladium; and
  the $NO_x$ storage material consists of a lanthanum-doped ceria.

In a second aspect of the invention there is provided A $NO_x$ adsorber catalyst comprising the $NO_x$ adsorber catalyst as hereinbefore defined supported on a metal or ceramic substrate.

In a third aspect of the invention there is provided a $NO_x$ adsorber catalyst comprising the $NO_x$ adsorber catalyst as hereinbefore defined, wherein the catalyst is extruded to form a flow-through or filter substrate.

In a fourth aspect of the invention there is provided a method of making a $NO_x$ storage material, comprising mixing a solution of a lanthanum-containing salt with ceria particles, spray-drying the particles, and heating the spray-dried particles.

In a fifth aspect of the invention there is provided a $NO_x$ adsorber catalyst for treating emissions from a lean burn engine, said $NO_x$ adsorber catalyst comprising a first layer, said first layer consisting essentially of:

a support material;

one or more platinum group metals disposed on the support material;

and a $NO_x$ storage material;

wherein the support material comprises alumina or a mixed oxide comprising alumina;

the one or more platinum group metals consists of a mixture or alloy of platinum and palladium; and the $NO_x$ storage material is obtainable by the method as hereinbefore defined.

In a sixth aspect of the invention there is provided an emission treatment system for treating a flow of a combustion exhaust gas comprising a lean-burn engine and the $NO_x$ adsorber catalyst as hereinbefore defined;

wherein the lean-burn engine is in fluid communication with the $NO_x$ adsorber catalyst; and wherein the lean-burn engine is a diesel engine.

In a seventh aspect of the invention there is provided a method of treating an exhaust gas from an internal combustion engine comprising contacting the exhaust gas with the $NO_x$ adsorber catalyst as hereinbefore defined.

Definitions

The term "washcoat" is well known in the art and refers to an adherent coating that is applied to a substrate, usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "substantially free of" as used herein with reference to a material means that the material may be present in a minor amount, such as ≤5% by weight, preferably ≤2% by weight, more preferably ≤1% by weight. The expression "substantially free of" embraces the expression "does not comprise".

DETAILED DESCRIPTION OF THE INVENTION

The NOx adsorber catalyst for treating emissions from a lean burn engine of the invention comprises a first layer, the first layer consisting essentially of: a support material; one or more platinum group metals disposed on the support material;

and a NOx storage material. The support material comprises alumina or a mixed oxide comprising alumina. The one or more platinum group metals consists of a mixture or alloy of platinum and palladium. The NOx storage material consists of a lanthanum-doped ceria.

The lanthanum-doped ceria consists of a cerium oxide and a lanthanum-containing component. In addition to lanthanum, the cerium oxide comprises cerium, oxygen, and optionally one or more metals or metal oxides selected from alumina, silica, titania, zirconia, magnesia, niobia, praseodymium, tantalum oxide, molybdenum oxide, tungsten oxide, a mixed oxide or composite oxide of any two or more thereof, and mixtures thereof. Preferred cerium oxides comprise ceria and one or more of alumina, magnesia, zirconium, titania, or mixed oxides or composite oxides thereof. Particularly preferred cerium oxides comprise ceria and zirconia, or ceria and alumina, or ceria and magnesia, in addition to the lanthanum-containing component. One especially preferred lanthanum-doped ceria consists of ceria and lanthanum, i.e. is lanthanum-doped ceria.

The lanthanum-containing component of the lanthanum-doped ceria can be any salt, oxide, complex or other compound that contains lanthanum, for example lanthanum(III) oxide. It may also be lanthanum metal. For the avoidance of doubt, this list of possible lanthanum-containing components is non-limiting.

The lanthanum-containing component may be present on the surface of the ceria. The lanthanum-containing component may, additionally or alternatively, be incorporated into the support material, the $NO_x$ storage material, or both. One example of the lanthanum-containing component being incorporated into the ceria would be the replacement of atoms of the ceria by lanthanum, e.g. in the lattice structure of either material.

The lanthanum-doped ceria which is present in the catalysts of the present invention are advantageous in that they store no, or substantially no, $NO_x$ above a given temperature, such as above 180, 200, 250, or 300° C., preferably above about 300° C. This is advantageous because a rich exhaust stream is therefore not necessary to release and/or convert $NO_x$ under "highway" conditions. This is especially preferable when the $NO_x$ adsorber catalyst is present upstream of an SCR or SCRF™ catalyst, as under such conditions the SCR or SCRF™ catalyst will achieve quantitative $NO_x$ conversion. In addition, this low or absent $NO_x$ storage at temperatures in excess of 180, 200, 250 or 300° C., preferably about 300° C., means that there will be no $NO_x$ stored when the vehicle is subsequently used under relatively cold conditions, e.g. under "city" conditions, which has the further advantage of reducing $NO_x$ slippage under such cold conditions.

In some embodiments, the lanthanum-doped ceria contains a characteristic Raman shift compared to an equivalent material that does not contain lanthanum. In one embodiment, the characteristic Raman shift is at 463 $cm^{-1}$, compared to 465 $cm^{-1}$ for the undoped ceria material.

The lanthanum-doped ceria may be characterised in that it has a crystallite size, as measured by X-ray diffraction, that is lower than in an equivalent material that does not contain lanthanum. The crystallite size of the lanthanum-doped ceria may be less than about 6.5 nm, e.g. 6.1 to 6.7 nm, preferably about 6.3 nm, compared to a crystal size of more than about 7.5 nm, e.g. 7.5 to 8.5 nm, preferably about 8.0 nm, for the undoped material. Without wishing to be bound by theory, it is believed that the lanthanum is incorporated into the lattice structure of the lanthanum-doped ceria.

The lanthanum-containing component can be present in any amount, but is preferably present in an amount of about 0.5-18 mol %, more preferably about 1-16 mol % lanthanum, still more preferably about 2-14 mol % lanthanum, expressed as a mol % of La in the lanthanum-doped ceria. For example, the lanthanum-containing component may be present in about 0.5, 1, 2, 4, 6, 8, 10, 11, 12, 14, 16, or 18 mol %.

The lanthanum-doped ceria preferably comprises about 5-30 wt %, more preferably about 7-20 wt % of lanthanum, expressed as a wt % of La in the lanthanum-doped ceria. For example, the lanthanum-doped ceria may be present in about 7, 10, 13, 16, 19, 22 or 26 mol %. If one or more additional layers are present in addition to the first layer, the wt % refers to the amount of lanthanum present in the first layer only.

The lanthanum-doped ceria preferably comprises about 1.0-15 wt %, more preferably about 2.0-11 wt % of lanthanum, expressed as a wt % of the $NO_x$ adsorber catalyst. If one or more additional layers are present in addition to the first layer, the wt % refers to the amount of lanthanum present in the first layer only.

The lanthanum-doped ceria preferably comprises about 1.0-15 mol %, more preferably about 2.0-12% of lanthanum, expressed as a mol % of the $NO_x$ adsorber catalyst. If one or more additional layers are present in addition to the first layer, the wt % refers to the amount of lanthanum present in the first layer only.

The support material is alumina, or a magnesia/alumina mixed oxide. Preferred support materials preferably have a surface area in the range 10 to 1500 $m^2/g$, pore volumes in the range 0.1 to 4 mL/g, and pore diameters from about 10 to 1000 Angstroms. High surface area supports having a surface area greater than 80 $m^2/g$ are particularly preferred, e.g. high surface area alumina. Other preferred support materials include magnesia/alumina composite oxides, optionally further comprising a cerium-containing component, e.g. ceria. In such cases the ceria may be present on the surface of the magnesia/alumina composite oxide, e.g. as a coating.

In some embodiments of the invention, the $NO_x$ storage material further comprises barium. It should be noted, however, that it is not necessary to include barium as a $NO_x$ storage material in the first layer of the NOx storage catalyst of the invention, i.e. barium is an optional component of the first layer. In other words, some catalysts of the invention are substantially free of barium.

Some catalysts of the invention are therefore barium-free $NO_x$ trap catalysts comprising a lanthanum-doped ceria. In such catalysts, the lanthanum-doped ceria may function as a $NO_x$ storage material.

Catalysts of the invention that are substantially free of barium, or do not comprise barium as a $NO_x$ storage material (e.g. barium-free $NO_x$ trap catalysts), may be particularly advantageous because they store less $NO_x$ at temperatures in excess of 180, 200, 250 or 300° C., preferably about 300° C. than a comparable barium-containing catalyst. In other words, catalysts of the invention that are substantially free of barium, or do not comprise barium as a $NO_x$ storage material, have improved $NO_x$ release properties at temperatures in excess of 180, 200, 250 or 300° C., preferably about 300° C. than a comparable barium-containing catalyst. Such catalysts may also have improved sulfur tolerance relative to an equivalent barium-containing catalyst. In this context, "improved sulfur tolerance" means that catalysts of the invention that are substantially free of barium are either more resistant to sulfation, can be thermally desulfated at a lower temperature, or both, compared to an equivalent barium-containing catalyst.

The one or more platinum group metals (PGM) consists of a mixture or alloy of platinum and palladium. The $NO_x$ adsorber catalyst preferably comprises 0.1 to 10 weight percent PGM, more preferably 0.5 to 5 weight percent PGM, and most preferably 1 to 3 weight percent PGM.

In preferred NOx adsorber catalysts of the invention, the first layer is substantially free of rhodium.

In preferred NOx adsorber catalysts of the invention, the first layer is substantially free of alkali metals, e.g. potassium (K) and sodium (Na).

In preferred NOx adsorber catalysts of the invention, the first layer is substantially free of molecular sieves. The term "molecular sieves" encompasses zeolites and zeolite-like structures, e.g. synthetic aluminophosphate molecular sieves.

In preferred NOx adsorber catalysts of the invention, the first layer is substantially free of dysprosium (Dy), erbium (Er), europium (Eu), gadolinium (Gd), holmium (Ho), lutetium (Lu), neodymium (Nd), praseodymium (Pr), promethium (Pm), samarium (Sm), scandium (Sc), terbium (Tb), thulium (Tm), ytterbium (Yb) and yttrium (Y).

The $NO_x$ adsorber catalyst of the invention may comprise further components that are known to the skilled person. For example, the catalysts of the invention may further comprise at least one binder and/or at least one surfactant. Where a binder is present, dispersible alumina binders are preferred.

The $NO_x$ adsorber catalyst of the present invention may be prepared by any suitable means. Preferably, the one or more platinum group metals, and/or $NO_x$ storage material are loaded onto the support by any known means to form a $NO_x$ adsorber catalyst. The manner of addition is not considered to be particularly critical. For example, a platinum group metal compound (such as platinum nitrate), a lanthanum compound (such as lanthanum nitrate), and a cerium compound (such as cerium nitrate) may be supported on a support (such as an alumina) by impregnation, adsorption, ion-exchange, incipient wetness, precipitation, or the like, or by any other means commonly known in the art.

The order of addition of the platinum group metal (PGM) and/or $NO_x$ storage component to the support is not considered critical. For example, the platinum group metal and NOx storage material may be added to the support simultaneously, or may be added sequentially in any order.

A further aspect of the invention is a $NO_x$ adsorber catalyst comprising the $NO_x$ adsorber catalyst as hereinbefore described supported on a metal or ceramic substrate. The substrate may be a flow-through substrate or a filter substrate, but is preferably a flow-through monolith substrate.

The flow-through monolith substrate has a first face and a second face defining a longitudinal direction therebetween. The flow-through monolith substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 100 to 500 channels per square inch, preferably from 200 to 400. For example, on the first face, the density of open first channels and closed second channels is from 200 to 400 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the flow-through monolith substrate described herein is a single component (i.e. a single brick). Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

In an alternative embodiment of the invention, the $NO_x$ adsorber catalyst comprising the $NO_x$ adsorber catalyst as hereinbefore described is extruded to form a flow-through or filter substrate.

In embodiments wherein the $NO_x$ adsorber catalyst comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the $NO_x$ adsorber catalyst comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Preferably, the $NO_x$ adsorber catalyst as hereinbefore described is prepared by depositing the $NO_x$ adsorber catalyst as hereinbefore described on the substrate using washcoat procedures. A representative process for preparing the $NO_x$ adsorber catalyst component using a washcoat procedure is set forth below. It will be understood that the process below can be varied according to different embodiments of the invention.

The washcoating is preferably performed by first slurrying finely divided particles of the $NO_x$ adsorber catalyst in an appropriate solvent, preferably water, to form a slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers or promoters, may also be incorporated in the slurry as a mixture of water soluble or water-dispersible compounds or complexes.

The substrate may then be coated one or more times with the slurry such that there will be deposited on the substrate the desired loading of the $NO_x$ adsorber catalyst.

Preferably, the $NO_x$ adsorber catalyst comprises a substrate and at least one layer on the substrate. In one embodiment, the at least one layer comprises the $NO_x$ adsorber catalyst as hereinbefore described. This can be produced by the washcoat procedure described above. One or more additional layers may be added to the one layer of $NO_x$ adsorber catalyst.

In embodiments wherein one or more additional layers are present (i.e. in addition to the first layer comprising $NO_x$ adsorber catalyst), the one or more additional layers have a different composition to the first layer comprising the $NO_x$ adsorber catalyst.

The one or more additional layers may comprise one zone or a plurality of zones, e.g. two or more zones. Where the one or more additional layers comprise a plurality of zones, the zones are preferably longitudinal zones. The plurality of zones, or each individual zone, may also be present as a gradient, i.e. a zone may not be of a uniform thickness along its entire length, to form a gradient. Alternatively a zone may be of uniform thickness along its entire length.

In some preferred embodiments, one additional layer, i.e. a second layer, is present.

Typically, the second layer comprises a platinum group metal (PGM) (referred to below as the "second platinum group metal"). It is generally preferred that the second layer comprises the second platinum group metal (PGM) as the only platinum group metal (i.e. there are no other PGM components present in the catalytic material, except for those specified).

The second PGM may be selected from the group consisting of platinum, palladium, and a combination or mixture of platinum (Pt) and palladium (Pd). Preferably, the platinum group metal is selected from the group consisting of palladium (Pd) and a combination or a mixture of platinum (Pt) and palladium (Pd). More preferably, the platinum group metal is selected from the group consisting of a combination or a mixture of platinum (Pt) and palladium (Pd).

It is generally preferred that the second layer is (i.e. is formulated) for the oxidation of carbon monoxide (CO) and/or hydrocarbons (HCs).

Preferably, the second layer comprises palladium (Pd) and optionally platinum (Pt) in a ratio by weight of 1:0 (e.g. Pd only) to 1:4 (this is equivalent to a ratio by weight of Pt:Pd of 4:1 to 0:1). More preferably, the second layer comprises platinum (Pt) and palladium (Pd) in a ratio by weight of <4:1, such as ≤3.5:1.

When the platinum group metal is a combination or mixture of platinum and palladium, then the second layer comprises platinum (Pt) and palladium (Pd) in a ratio by weight of 5:1 to 3.5:1, preferably 2.5:1 to 1:2.5, more preferably 1:1 to 2:1.

The second layer typically further comprises a support material (referred to herein below as the "second support material"). The second PGM is generally disposed or supported on the second support material.

The second support material is preferably a refractory oxide. It is preferred that the refractory oxide is selected from the group consisting of alumina, silica, ceria, silica alumina, ceria-alumina, ceria-zirconia and alumina-magnesium oxide. More preferably, the refractory oxide is selected from the group consisting of alumina, ceria, silica-alumina and ceria-zirconia. Even more preferably, the refractory oxide is alumina or silica-alumina, particularly silica-alumina.

A particularly preferred second layer comprises a silica-alumina support, platinum, palladium, barium, a molecular sieve, and a platinum group metal (PGM) on an alumina support, e.g. a rare earth-stabilised alumina. Particularly preferably, this preferred second layer comprises a first zone comprising a silica-alumina support, platinum, palladium, barium, a molecular sieve, and a second zone comprising a platinum group metal (PGM) on an alumina support, e.g. a rare earth-stabilised alumina. This preferred second layer may have activity as an oxidation catalyst, e.g. as a diesel oxidation catalyst (DOC).

A further preferred second layer comprises, consists of, or consists essentially of a platinum group metal on alumina. This preferred second layer may have activity as an oxidation catalyst, e.g. as a $NO_2$-maker catalyst.

A further preferred second layer comprises a platinum group metal, rhodium, and a cerium-containing component.

In other preferred embodiments, more than one of the preferred second layers described above are present, in addition to the first layer comprising the $NO_x$ adsorber catalyst. In such embodiments, the one or more additional layers may be present in any configuration, including zoned configurations.

The first layer comprising the $NO_x$ adsorber catalyst may be disposed or supported on the second layer or the substrate (e.g. the plurality of inner surfaces of the through-flow monolith substrate), preferably the second layer is disposed or supported on the first layer comprising the $NO_x$ adsorber catalyst.

The second layer may be disposed or supported on the substrate (e.g. the plurality of inner surfaces of the through-flow monolith substrate).

The second layer may be disposed or supported on the entire length of the substrate or the first layer comprising the $NO_x$ adsorber catalyst. Alternatively the second layer may be disposed or supported on a portion, e.g. 5%, 10%, 20%, 30%, 40%, 50%, 60%, 70%, 80%, 90%, or 95%, of the substrate or the first layer comprising the $NO_x$ adsorber catalyst.

Preferably, the entire length of the substrate is coated with the first layer comprising the $NO_x$ adsorber catalyst.

A further aspect of the invention is a method of making the $NO_x$ adsorber catalyst as hereinbefore described, comprising adding one or more precious group metals or precious group metal salts to a support material to form a PGM-support mixture, and adding a $NO_x$ storage material to the PGM-support mixture. Preferred methods further comprise the step of forming a lanthanum-containing $NO_x$ storage material, i.e. a lanthanum-doped ceria. In some preferred methods, the lanthanum-doped ceria (i.e. the $NO_x$ storage material) is formed by incipient wetness impregnation.

The lanthanum-doped ceria may be formed by spray-drying. A further aspect of the invention is a method of making a $NO_x$ storage material, comprising mixing a solution of a lanthanum-containing salt with ceria particles, spray-drying the particles, and heating the spray-dried particles.

In preferred methods of the invention, the mixing of the neodymium-containing salt with ceria particles is carried out in a solvent, e.g. water.

In some preferred methods, the spray-drying of the particles is carried out with an inlet temperature of between 250 and 350° C., preferably between 280 and 320° C., particularly preferably about 300° C.

In some preferred methods, the spray-drying of the particles is carried out with an outlet temperature of between 80 and 150° C., preferably between 100 and 130° C., particularly preferably about 110° C.

In some preferred methods, the spray-dried powder is heated at a temperature of between 250 and 600° C., preferably between 400 and 550° C., particularly preferably about 500° C.

Some preferred methods comprise the additional step of drying the heated spray-dried powder at a temperature of between 600 and 800° C., preferably between 620 and 680° C., particularly preferably about 650° C.

Further preferred methods of the invention further comprise one or more additional steps, such as adding at least one binder and/or adding at least one surfactant.

A further aspect of the invention is a NOx adsorber catalyst for treating emissions from a lean burn engine, the NOx adsorber catalyst comprising a first layer, the first layer consisting essentially of: a support material; one or more platinum group metals disposed on the support material; and a NOx storage material; wherein the support material comprises alumina or a mixed oxide comprising alumina; the one or more platinum group metals consists of a mixture or alloy of platinum and palladium; and the NOx storage material is obtainable by the method as hereinbefore described. In other words, the NOx storage material is obtainable by mixing a solution of a lanthanum-containing salt with ceria particles, spray-drying the particles, and heating the spray-dried particles.

A further aspect of the invention is an emission treatment system for treating a flow of a combustion exhaust gas that comprises a lean burn engine and the $NO_x$ adsorber catalyst as hereinbefore described. In preferred systems, the lean burn engine is a diesel engine, preferably a light duty diesel engine. The $NO_x$ adsorber catalyst may be placed in a close-coupled position or in the underfloor position.

The emission treatment system typically further comprises an emissions control device.

The emissions control devices is preferably downstream of the $NO_x$ adsorber catalyst.

Examples of an emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the emission treatment system comprises an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the emission treatment system of the invention comprises an SCR catalyst or an SCRF™ catalyst, then the emission treatment system may further comprise an injector for injecting a nitrogenous reductant, such as ammonia, or an ammonia precursor, such as urea or ammonium formate, preferably urea, into exhaust gas downstream of the $NO_x$ adsorber catalyst and upstream of the SCR catalyst or the SCRF™ catalyst.

Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst), e.g. a $NO_x$ adsorber catalyst comprising the $NO_x$ adsorber catalyst of the invention. Thus, the emission treatment system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the emission treatment system of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first emission treatment system embodiment, the emission treatment system comprises the $NO_x$ adsorber catalyst of the invention and a catalysed soot filter (CSF). The $NO_x$ adsorber catalyst is typically followed by (e.g. is upstream of) the catalysed soot filter (CSF). Thus, for example, an outlet of the $NO_x$ adsorber catalyst is connected to an inlet of the catalysed soot filter.

A second emission treatment system embodiment relates to an emission treatment system comprising the $NO_x$ adsorber catalyst of the invention, a catalysed soot filter (CSF) and a selective catalytic reduction (SCR) catalyst.

The $NO_x$ adsorber catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third emission treatment system embodiment, the emission treatment system comprises the $NO_x$ adsorber catalyst of the invention, a selective catalytic reduction (SCR) catalyst and either a catalysed soot filter (CSF) or a diesel particulate filter (DPF).

In the third emission treatment system embodiment, the $NO_x$ adsorber catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the catalyzed monolith substrate may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth emission treatment system embodiment comprises the $NO_x$ adsorber catalyst of the invention and a selective catalytic reduction filter (SCRF™) catalyst. The $NO_x$ adsorber catalyst of the invention is typically followed by (e.g. is upstream of) the selective catalytic reduction filter (SCRF™) catalyst.

A nitrogenous reductant injector may be arranged between the $NO_x$ adsorber catalyst and the selective catalytic reduction filter (SCRF™) catalyst. Thus, the $NO_x$ adsorber catalyst may be followed by (e.g. is upstream of) a nitrogenous reductant injector, and the nitrogenous reductant injector may be followed by (e.g. is upstream of) the selective catalytic reduction filter (SCRF™) catalyst.

When the emission treatment system comprises a selective catalytic reduction (SCR) catalyst or a selective catalytic reduction filter (SCRF™) catalyst, such as in the second to fourth exhaust system embodiments described hereinabove, an ASC can be disposed downstream from the SCR catalyst or the SCRF™ catalyst (i.e. as a separate monolith substrate), or more preferably a zone on a downstream or trailing end of the monolith substrate comprising the SCR catalyst can be used as a support for the ASC.

Another aspect of the invention relates to a vehicle. The vehicle comprises an internal combustion engine, preferably a diesel engine. The internal combustion engine preferably the diesel engine, is coupled to an emission treatment system of the invention.

It is preferred that the diesel engine is configured or adapted to run on fuel, preferably diesel fuel, comprising ≤50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg. In the US, a light-duty diesel vehicle (LDV) refers to a diesel vehicle having a gross weight of ≤8,500 pounds (US lbs.). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs.), as defined in US legislation.

A further aspect of the invention is a method of treating an exhaust gas from an internal combustion engine comprising contacting the exhaust gas with the $NO_x$ adsorber catalyst as hereinbefore described. In preferred methods, the exhaust gas is a rich gas mixture. In further preferred methods, the exhaust gas cycles between a rich gas mixture and a lean gas mixture.

In some preferred methods of treating an exhaust gas from an internal combustion engine, the exhaust gas is at a temperature of about 180 to 300° C.

In further preferred methods of treating an exhaust gas from an internal combustion engine, the exhaust gas is contacted with one or more further emissions control devices, in addition to the $NO_x$ adsorber catalyst as hereinbefore described. The emissions control device or devices is preferably downstream of the $NO_x$ adsorber catalyst.

Examples of a further emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the method comprises contacting the exhaust gas with an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the method of the invention comprises contacting the exhaust gas with an SCR catalyst or an SCRF™ catalyst, then the method may further comprise the injection of a nitrogenous reductant, such as ammonia, or an ammonia precursor, such as urea or ammonium formate, preferably urea, into exhaust gas downstream of the $NO_x$ adsorber catalyst and upstream of the SCR catalyst or the SCRF™ catalyst.

Such an injection may be carried out by an injector. The injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst). Thus, the method may further comprise enriching of the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the method of treating an exhaust gas of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first embodiment, the method comprises contacting the exhaust gas with the $NO_x$ adsorber catalyst of the invention and a catalysed soot filter (CSF). The $NO_x$ adsorber catalyst is typically followed by (e.g. is upstream of) the catalysed soot filter (CSF). Thus, for example, an outlet of the $NO_x$ adsorber catalyst is connected to an inlet of the catalysed soot filter.

A second embodiment of the method of treating an exhaust gas relates to a method comprising contacting the exhaust gas with the $NO_x$ adsorber catalyst of the invention, a catalysed soot filter (CSF) and a selective catalytic reduction (SCR) catalyst.

The $NO_x$ adsorber catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third embodiment of the method of treating an exhaust gas, the method comprises contacting the exhaust gas with the $NO_x$ adsorber catalyst of the invention, a selective catalytic reduction (SCR) catalyst and either a catalysed soot filter (CSF) or a diesel particulate filter (DPF).

In the third embodiment of the method of treating an exhaust gas, the $NO_x$ adsorber catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the $NO_x$ adsorber catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth embodiment of the method of treating an exhaust gas comprises the $NO_x$ adsorber catalyst of the invention and a selective catalytic reduction filter (SCRF™) catalyst. The $NO_x$ adsorber catalyst of the invention is typically followed by (e.g. is upstream of) the selective catalytic reduction filter (SCRF™) catalyst.

A nitrogenous reductant injector may be arranged between the $NO_x$ adsorber catalyst and the selective catalytic reduction filter (SCRF™) catalyst. Thus, the $NO_x$ adsorber catalyst may be followed by (e.g. is upstream of) a nitrogenous reductant injector, and the nitrogenous reductant injector may be followed by (e.g. is upstream of) the selective catalytic reduction filter (SCRF™) catalyst.

When the emission treatment system comprises a selective catalytic reduction (SCR) catalyst or a selective catalytic reduction filter (SCRF™) catalyst, such as in the second to fourth method embodiments described hereinabove, an ASC can be disposed downstream from the SCR catalyst or the SCRF™ catalyst (i.e. as a separate monolith substrate), or more preferably a zone on a downstream or trailing end of the monolith substrate comprising the SCR catalyst can be used as a support for the ASC.

A further aspect of the invention is the use of a lanthanum-containing material to improve the low temperature $NO_x$ storage capacity of a $NO_x$ adsorber material, relative to an equivalent $NO_x$ adsorber material that does not contain the lanthanum-containing material.

A still further aspect of the invention is the use of a lanthanum-containing material to decrease the $NO_x$ storage capacity of a $NO_x$ adsorber material at a given temperature, relative to an equivalent $NO_x$ adsorber material that does not contain the lanthanum-containing material. Preferably the given temperature is about 200° C., more preferably about 250° C., still more preferably about 280° C., particularly preferably about 300° C.

A still further aspect of the invention is the use of a lanthanum-containing material to improve the sulfur tolerance of a $NO_x$ adsorber material, relative to an equivalent $NO_x$ adsorber material that does not contain the lanthanum-containing material.

EXAMPLES

The invention will now be illustrated by the following non-limiting examples.

Methods

X-Ray diffraction data was determined using a Bruker AXS D8 diffractometer and a Lynxeye PSD detector. Cu Kα radiation was used, with a scan range of 10 to 130° 2θ, 0.02° step size, in θ/θ coupled scan mode, at a tube voltage of 40 kV and current of 40 mA, at ambient temperature.

Materials

All materials are commercially available and were obtained from known suppliers, unless noted otherwise.

General Preparation (1)—[Ce.La]

$CeO_2$ powder is impregnated using a solution of lanthanum(III) nitrate in water. The impregnated powder is then dried overnight at 110° C., followed by calcining at 650° C. for 1 hour.

General Preparation (2)—[$Al_2O_3$.La]

$Al_2O_3$ (boehmite) powder is impregnated using a solution of lanthanum(III) nitrate in water. The impregnated powder is then dried overnight at 110° C., followed by calcining at 650° C. for 1 hour.

General Preparation (3)—[Ce.Nd]

$CeO_2$ powder is impregnated using a solution of neodymium(III) nitrate in water. The impregnated powder is then dried overnight at 110° C., followed by calcining at 650° C. for 1 hour.

General Preparation (4)—Spray-Dried [Ce.La]

903 g $La(NO_3)_3$ was dissolved in 3583 g demineralized water. 1850 g of a high surface area $CeO_2$ was added in powder form and the mixture stirred for 60 minutes. The resulting slurry was spray-dried on a Spray Dryer in countercurrent mode (two-fluid, fountain nozzle, with inlet temperature set at 300° C. and outlet 110° C.). The resulting powder was collected from the cyclone.

The powder was calcined at 650° C. for 1 hour in a static oven.

Example 1

Preparation of $Al_2O_3$ PGM Ce 1.5 g/in$^3$ $Al_2O_3$ is made into a slurry with distilled water and then milled to a $d_{90}$ of 13-15 μm. To the slurry, 94 g/ft$^3$ Pt malonate and 19 g/ft$^3$ Pd nitrate solution is then added, and stirred until homogenous. The Pt/Pd is allowed to adsorb onto the $Al_2O_3$ support for 1 hour.

To this is then added 3 g/in$^3$ high surface area ceria and 0.2 g/in$^3$ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 51.9 wt % (51.1 mol %).

Example 2

Preparation of [$Al_2O_3$.La (13.0 wt %)] PGM Ce (10.7 mol % $Al_2O_3$.La)

Prepared as in Example 1, but using [$Al_2O_3$.La] (prepared according to general preparation (2) above).

The Ce is present at a loading of about 49.1 wt % (49.9 mol %) The La is present at a loading of about 4.6% (4.8 mol %).

Example 3

Preparation of [$Al_2O_3$.La (26.6 wt %)] PGM Ce (24.9 mol % $Al_2O_3$.La)

Prepared as in Example 1, but using [$Al_2O_3$.La] (prepared according to general preparation (2) above).

The Ce is present at a loading of about 45.4 wt % (48.1 mol %) The La is present at a loading of about 10.8 wt % (11.5 mol %).

Experimental Results

Catalytic activity was determined using a synthetic gas bench test. The cores were tested in a simulated catalyst activity testing (SCAT) gas apparatus using the inlet gas mixture in Table 1. The test consisted of five cycles of 300 seconds lean/16 seconds rich, at a space velocity (SV) of 40,000

TABLE 1

|  | Lean | Rich |
| --- | --- | --- |
| $O_2$ (%) | 12 | 0.9 |
| $CO_2$ (%) | 6 | 10 |
| $H_2O$ (%) | 6 | 12 |
| NO (ppm) | 200 | 100 |
| $C_3H_6$ (ppm as $C_1$) | 500 | 3000 |
| CO (ppm) | 1500 | 21000 |
| $H_2$ (ppm) | — | 7500 |

Results

The results from one representative cycle of the SCAT test are shown in Table 2 below.

TABLE 2

| Temperature | $NO_x$ conversion (%) | | |
| --- | --- | --- | --- |
| (° C.) | Example 1 | Example 2 | Example 3 |
| 150 | 0 | 0 | 0 |
| 175 | 0 | 16 | 18 |
| 200 | 15 | 37 | 25 |
| 250 | 46 | 64 | 48 |

From Table 2 it can be seen that Example 2, comprising 400 g/ft³ La, shows increased $NO_x$ conversion in the 150-250° C. range compared to Example 1, which does not comprise a lanthanum-containing component. It can also be seen that Example 3, comprising 1000 g/ft³ La, while similarly showing increased $NO_x$ conversion relative to Example 1, is less effective at $NO_x$ conversion in this temperature range than Example 2, despite the higher loading of La compared to this Example (i.e. 1000 g/ft³ La compared to 400 g/ft³ La). This indicates that too high a loading of a lanthanum-containing component may be detrimental to $NO_x$ adsorber catalyst performance.

Example 4

Preparation of "Ce ref"

1.54 g/in³ 10% Ce on 20% $MgO/Al_2O_3$ Spinel is made into a slurry with distilled water and then milled to a $d_{90}$ of 13-15 μm. To the slurry, 94 g/ft³ Pt malonate and 19 g/ft³ Pd nitrate solution is then added, and stirred until homogenous. The Pt/Pd is allowed to adsorb onto the $CeO_2$ support for 1 hour.

To this is then added 3 g/in³ of high surface area Ce and 0.2 g/in³ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 54.2 wt % (49.0 mol %).

Example 5

Preparation of 10% Ce on 20% $MgO/Al_2O_3$ Spinel (10.1 wt % Ce) PGM [Ce.La (7.0 wt %)] (9.1 mol % Ce.La)

1.54 g/in³ 10% Ce on 20% $MgO/Al_2O_3$ Spinel is made into a slurry with distilled water and then milled to a $d_{90}$ of 13-15 μm. To the slurry, 94 g/ft³ Pt malonate and 19 g/ft³ Pd nitrate solution is then added, and stirred until homogenous. The Pt/Pd is allowed to adsorb onto the 10% Ce on 20% $MgO/Al_2O_3$ Spinel support for 1 hour.

To this is then added 3.27 g/in³ of [Ce.La] (prepared according to general procedure (1) above), followed by 0.2 g/in³ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 51.8 wt % (48.0 mol %). The La is present at a loading of about 4.6 wt % (4.3 mol %).

Example 6

Preparation of 10% Ce on 20% $MgO/Al_2O_3$ Spinel (10.1 wt % Ce) PGM [$CeO_2$.La (10.3 wt %)] 13.5 mol % Ce.La Prepared as in Example 5, but using [$CeO_2$.La] (prepared according to general preparation (1) above).

The Ce is present at a loading of about 50.4 wt % (47.5 mol %). The La is present at a loading of about 6.8 wt % (6.5 mol %).

Example 7

Preparation of 10% Ce on 20% $MgO/Al_2O_3$ Spinel (10.1 wt % Ce) PGM [$CeO_2$La (13.0 wt %)] (17.3 mol % $CeO_2$.La)

Prepared as in Example 5, but using [$CeO_2$.La] (prepared according to general preparation (1) above).

The Ce is present at a loading of about 49.1 wt % (47.0 mol %). The La is present at a loading of about 8.7 wt % (8.4 mol %).

Example 8

Preparation of 10% Ce on 20% $MgO/Al_2O_3$ Spinel (10.1 wt % Ce) PGM [$CeO_2$.La (15.8 wt %)] (21.4 mol % $CeO_2$.La)

Prepared as in Example 5, but using [$CeO_2$.La] (prepared according to general preparation (1) above).

The Ce is present at a loading of about 47.8 wt % (46.5 mol %). The La is present at a loading of about 10.7 wt % (10.5 mol %).

Experimental Results

Core samples were taken from each of the catalysts of Examples 4-8. The cores were pre-conditioned by heating in a ramp to 600° C. in a gas mixture comprising 6% $CO_2$, 12% $O_2$, 6% $H_2O$ and balance $N_2$.

Catalytic activity was determined using a synthetic gas bench test. The cores were tested in a simulated catalyst activity testing (SCAT) gas apparatus using the inlet gas mixture in Table 3. The test consisted of five cycles of 300 seconds lean/16 seconds rich, at a space velocity (SV) of 40,000 h⁻¹.

TABLE 3

|  | Lean | Rich |
|---|---|---|
| $O_2$ (%) | 12 | 0.9 |
| $CO_2$ (%) | 6 | 10 |
| $H_2O$ (%) | 6 | 12 |
| NO (ppm) | 200 | 200 |
| $C_3H_6$ (ppm as $C_1$) | 500 | 3000 |
| CO (ppm) | 1500 | 21000 |
| $H_2$ (ppm) | — | 7500 |

Results

The results from one representative cycle of the SCAT test at 250° C. are shown in Table 4 below.

TABLE 4

| Time (seconds) | $NO_x$ concentration (ppm) | | | | |
|---|---|---|---|---|---|
| | Example 4 | Example 5 | Example 6 | Example 7 | Example 8 |
| 825 | 128 | 68 | 21 | 10 | 12 |
| 875 | 141 | 100 | 40 | 19 | 25 |
| 925 | 151 | 128 | 66 | 36 | 45 |
| 975* | 19 | 7 | 5 | 5 | 4 |

*after rich event

It can be seen from Table 4 that each of Examples 5-8, comprising between 400 and 1000 g/ft³ La, result in lower $NO_x$ concentration at the catalyst outlet than Example 4, which contains no La. It can be seen that Example 8, however, having 1000 g/ft³ La, shows marginally more $NO_x$ slip (i.e. higher catalyst output $NO_x$ concentration) than any of Examples 5, 6, and 7, suggesting that too high a loading of La may result in diminishing returns in terms of $NO_x$ adsorber performance.

Example 9

Preparation of 10% Ce on 20% $MgO/Al_2O_3$ Spinel (10.1 wt % Ce) PGM [$CeO_2$.Nd (3.7 wt %)] 4.5 mol % Ce.Nd Prepared as in Example 5, but using [$CeO_2$.Nd] (prepared according to general preparation (3) above).

The Ce is present at a loading of about 53.2 wt % (48.9 mol %). The Nd is present at a loading of about 2.4 wt % (2.1 mol %).

Example 10

Preparation of 10% Ce on 20% $MgO/Al_2O_3$ Spinel (10.1 wt % Ce) PGM [$CeO_2$Nd (7.0 wt %)] (8.72 mol % $CeO_2$.Nd)

Prepared as in Example 5, but using [$CeO_2$.Nd] (prepared according to general preparation (3) above).

The Ce is present at a loading of about 51.8 wt % (48.1 mol %). The Nd is present at a loading of about 4.6 wt % (4.1 mol %).

Example 11

Preparation of 10% Ce on 20% $MgO/Al_2O_3$ Spinel (10.1 wt % Ce) PGM [$CeO_2$.Nd (10.2 wt %)] (12.9 mol % $CeO_2$.Nd)

Prepared as in Example 5, but using [$CeO_2$.Nd] (prepared according to general preparation (3) above).

The Ce is present at a loading of about 50.4 wt % (47.6 mol %). The Nd is present at a loading of about 6.7 wt % (6.2 mol %).

Experimental Results

Core samples were taken from each of the catalysts of Examples 4-7 and 9-11. The cores were pre-conditioned by heating in a ramp to 600° C. in a gas mixture comprising 6% $CO_2$, 12% $O_2$, 6% $H_2O$ and balance $N_2$.

Catalytic activity was determined using a synthetic gas bench test. The cores were tested in a simulated catalyst activity testing (SCAT) gas apparatus using the inlet gas mixture in Table 5. The test consisted of five cycles of 300 seconds lean/16 seconds rich, at a space velocity (SV) of 40,000 h⁻¹.

TABLE 5

|  | Lean | Rich |
|---|---|---|
| $O_2$ (%) | 12 | 0.9 |
| $CO_2$ (%) | 6 | 10 |
| $H_2O$ (%) | 6 | 12 |
| NO (ppm) | 200 | 200 |
| $C_3H_6$ (ppm as $C_1$) | 500 | 3000 |
| CO (ppm) | 1500 | 21000 |
| $H_2$ (ppm) | — | 7500 |

Results

The results from one representative cycle of the SCAT test at 200° C. are shown in Table 6 below.

TABLE 6

| Time (s) | NOx concentration (ppm) | | | | | |
|---|---|---|---|---|---|---|
| | Ex. 4 | Ex. 5 | Ex. 6 | Ex. 7 | Ex. 9 | Ex. 10 | Ex. 11 |
| 825 | 176 | 81 | 34 | 21 | 86 | 57 | 42 |
| 875 | 176 | 94 | 47 | 30 | 96 | 73 | 56 |
| 925 | 177 | 106 | 60 | 41 | 104 | 88 | 70 |
| 975* | 141 | 8 | 5 | 5 | 8 | 9 | 10 |

*after rich event

In Table 6, Example 4 is the reference, i.e. undoped example. Examples 5, 6 and 7 comprise 400, 600 and 800 g/ft³ La, respectively. Examples 9, 10 and 11 comprise 400, 600 and 800 g/ft³ Nd, respectively.

It can be seen from Table 6 that each of Examples 5-7, comprising between 400 and 800 g/ft³ La, result in lower $NO_x$ concentration at the catalyst outlet than Example 4, which contains no La. It can also be seen that lanthanum-containing Examples 5-7 generally show lower $NO_x$ slip (i.e. lower catalyst output $NO_x$ concentration) than neodymium-containing Examples 9-11. This is particularly the case at 600 and 800 g/ft³ loadings—see Example 6 compared to Example 10, and Example 7 compared to Example 11, respectively.

These results show that compositions comprising a lanthanum-containing component have better $NO_x$ adsorber performance than both comparable compositions comprising no dopant, and comparable compositions comprising another dopant, i.e. neodymium.

Example 12

Preparation of 10% Ce on 20% $MgO/Al_2O_3$ Spinel (10.1 wt % Ce) PGM Ce 1.54 g/in³ 10% Ce on 20% $MgO/Al_2O_3$ Spinel is made into a slurry with distilled water and then milled to a $d_{90}$ of 13-15 μm. To the slurry, 94 g/ft³ Pt malonate and 19 g/ft³ Pd nitrate solution is then added, and stirred until homogenous. The Pt/Pd is allowed to adsorb onto the 10% Ce on 20% $MgO/Al_2O_3$ Spinel support for 1 hour.

To this is then added 3 g/in of ceria, followed by 0.2 g/in$^3$ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 54.1 wt % (49.0 mol %).

Example 13

Preparation of 10% Ce on 20% MgO/Al$_2$O$_3$ Spinel (10.1 wt % Ce) PGM [Ce.Ba (2.8 wt %)]) (3.5 mol % Ce.Ba)

A CeO$_2$—BaCO$_3$ composite material is formed from barium acetate and high surface area ceria, followed by calcination at 650° C. for 1 hour.

1.54 g/in$^3$ 10% Ce on 20% MgO/Al$_2$O$_3$ Spinel is made into a slurry with distilled water and then milled to a d$_{90}$ of 13-15 μm. To the slurry, 94 g/ft$^3$ Pt malonate and 19 g/ft$^3$ Pd nitrate solution is then added, and stirred until homogenous. The Pt/Pd is allowed to adsorb onto the 10% Ce on 20% MgO/Al$_2$O$_3$ Spinel support for 1 hour.

To this is then added 3.13 Win of CeO$_2$—BaCO$_3$ composite material, followed by 0.2 g/in$^3$ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 53.3 wt % (48.3 mol %). The Ba is present at a loading of about 1.8 wt % (1.6 mol %).

Example 14

Preparation of 10% Ce on 20% MgO/Al$_2$O$_3$ Spinel (10.1 wt % Ce) PGM [Ce.Ba (7 wt %)] (8.7 mol % Ce.Ba)

A CeO$_2$—BaCO$_3$ composite material is formed from barium acetate and high surface area ceria, followed by calcination at 650° C. for 1 hour.

1.54 g/in$^3$ 10% Ce on 20% MgO/Al$_2$O$_3$ Spinel is made into a slurry with distilled water and then milled to a d$_{90}$ of 13-15 μm. To the slurry, 94 g/ft$^3$ Pt malonate and 19 g/ft$^3$ Pd nitrate solution is then added, and stirred until homogenous. The Pt/Pd is allowed to adsorb onto the 10% Ce on 20% MgO/Al$_2$O$_3$ Spinel support for 1 hour.

To this is then added 3.33 Win of CeO$_2$—BaCO$_3$ composite material, followed by 0.2 g/in$^3$ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 51.2 wt % (47 mol %). The Ba is present at a loading of about 4.5 wt % (4.2 mol %).

Example 15

Preparation of 10% Ce on 20% MgO/Al$_2$O$_3$ Spinel (10.1 wt % Ce) PGM [Ce.Nd (7 wt %)] (8.7 mol % Ce.Nd)

1.54 g/in$^3$ 10% Ce on 20% MgO/Al$_2$O$_3$ Spinel is made into a slurry with distilled water and then milled to a d$_{90}$ of 13-15 μm. To the slurry, 94 g/ft$^3$ Pt malonate and 19 g/ft$^3$ Pd nitrate solution is then added, and stirred until homogenous. The Pt/Pd is allowed to adsorb onto the 10% Ce on 20% MgO/Al$_2$O$_3$ Spinel support for 1 hour.

To this is then added 3.27 g/in$^3$ of [Ce.Nd] (prepared according to general procedure (3) above), followed by 0.2 g/in$^3$ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 51.8 wt % (48.3 mol %). The Nd is present at a loading of about 4.6 wt % (4.1 mol %).

Example 16

Preparation of 10% Ce on 20% MgO/Al$_2$O$_3$ Spinel (10.1 wt % Ce) PGM [Ce.La (7.0 wt %)] (9.1 mol % Ce.La)

1.54 g/in$^3$ 10% Ce on 20% MgO/Al$_2$O$_3$ Spinel is made into a slurry with distilled water and then milled to a d$_{90}$ of 13-15 μm. To the slurry, 94 g/ft$^3$ Pt malonate and 19 g/ft$^3$ Pd nitrate solution is then added, and stirred until homogenous. The Pt/Pd is allowed to adsorb onto the 10% Ce on 20% MgO/Al$_2$O$_3$ Spinel support for 1 hour.

To this is then added 3.27 g/in$^3$ of [Ce.La] (prepared according to general procedure (1) above), followed by 0.2 g/in$^3$ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 51.8 wt % (48.0 mol %). The La is present at a loading of about 4.6 wt % (4.3 mol %).

Experimental Results

Core samples were taken from each of the catalysts of Examples 12-16. The cores were sulfated to 2 g/L sulfur by heating at 350° C. in a gas mixture comprising 8% H$_2$O, 14% O$_2$, 35 ppm SO$_2$ and balance N$_2$, at a space velocity (SV) of 45,000 h$^{-1}$.

Desulfation activity was determined using a synthetic gas bench test. The cores were tested in a simulated catalyst activity testing (SCAT) gas apparatus using the inlet gas mixture in Table 7 over a 20° C./min temperature ramp from 120 to 650° C. at a space velocity (SV) of 45,000 h$^{-1}$. H$_2$S and SO$_2$ release was measured by mass spectrometry, and the results are shown in Table 8.

TABLE 7

| | |
|---|---|
| O$_2$ (%) | 0.98 |
| CO$_2$ (%) | 13.24 |
| H$_2$O (%) | 10 |
| C$_3$H$_6$ (ppm as C$_1$) | 3373 |
| CO (ppm) | 21200 |
| H$_2$ (%) | 0.64 |

TABLE 8

| | DeSO$_x$ efficiency (%)* | | | | |
|---|---|---|---|---|---|
| Temperature (° C.) | Example 12 | Example 13 | Example 14 | Example 15 | Example 16 |
| 400 | 15 | 20 | 18 | 19 | 22 |
| 450 | 54 | 56 | 49 | 59 | 66 |
| 500 | 81 | 76 | 69 | 84 | 90 |
| 550 | 89 | 82 | 76 | 91 | 95 |
| 600 | 92 | 84 | 81 | 93 | 97 |

*normalized to 2.3 g/L loading

It can be seen from Table 8 that Example 16, comprising 400 g/ft³ La, undergoes more efficient desulfation at a given temperature than any of Examples 12-15, which do not comprise a lanthanum-containing component. Notably, Example 16 shows improved desulfation efficiency relative to Example 12, comprising undoped cerium, and to Examples 13 and 14, comprising 150 and 400 g/ft³ Ba, respectively. Furthermore, Example 16 also shows improved desulfation efficiency relative to Example 15, comprising 400 g/ft³ Nd. This is particularly apparent at the 450 and 500° C. data points shown in Table 8 above.

An alternative representation of the $DeSO_x$ efficiency data obtained as described above is shown in Table 9.

TABLE 9

| $DeSO_x$ Efficiency (%) | Temperature to achieve $DeSO_x$ efficiency (° C.) | | | | |
|---|---|---|---|---|---|
| | Example 12 | Example 13 | Example 14 | Example 15 | Example 16 |
| 50 | 440 | 437 | 448 | 436 | 429 |
| 60 | 455 | 451 | 466 | 448 | 440 |
| 70 | 470 | 472 | 495 | 461 | 452 |
| 80 | 488 | 506 | 562 | 478 | 466 |
| 90 | 531 | n/a* | n/a* | 516 | 489 |

*90% sulfur removal not achieved

From Table 9 it can be seen that Example 16, comprising 400 g/ft³ La, achieves a given % of $DeSO_x$ efficiency at a lower temperature than each of Examples 12-15, which do not comprise a lanthanum-containing component. Neither of Examples 13 or 14, comprising 150 and 400 g/ft³ Ba respectively, achieved 90% sulfur removal, whereas Example 16 achieved 90% sulfur removal at 489° C.—lower than Example 12 comprising undoped ceria, and lower than Example 15, comprising 400 g/ft³ Nd.

It can therefore be seen from Table 8 and Table 9 that the catalysts comprising a lanthanum-containing component can be more easily desulfated, i.e. at lower temperatures (or with higher efficiency at a given temperature) than the catalysts that do not comprise a lanthanum-containing component (including those containing neodymium).

X-Ray Diffraction Data

TABLE 10

| Sample | Phase | Crystal System | Space Group | Crystallite size LVol-IB (nm) | Lattice Parameter a (Å) |
|---|---|---|---|---|---|
| $Pt/CeO_2$ | $CeO_2$ | FCC | Fm-3m (225) | 8.0(1) | 5.4106(2) |
| $Pt/10Nd/CeO_2$ | '$CeO_2$' | FCC | Fm-3m (225) | 6.4(1) | 5.4176(4) |
| $Pt/10La/CeO_2$ | '$CeO_2$' | FCC | Fm-3m (225) | 6.3(1) | 5.4262(4) |
| $Pt/10Mg/CeO_2$ | '$CeO_2$' | FCC | Fm-3m (225) | 9.8(1) | 5.4092(4) |

X-ray diffraction data was collected as described above. It can be seen from Table 10 that the composition comprising lanthanum has a crystallite size that is lower than in an equivalent material that does not contain lanthanum, i.e. undoped ceria in the $Pt/CeO_2$ example. It is also notable that the crystallite size is also lower than a neodymium-containing example, and a magnesium-containing example, suggesting that this effect is not universal for all dopants. Without wishing to be bound by theory, it is believed that the lanthanum is incorporated into the lattice structure of the lanthanum-containing component, e.g. lanthanum-doped ceria.

It can also be seen that the Lattice Parameter in the lanthanum-containing sample increases relative to the samples that do not contain lanthanum, again including both the neodymium-containing example and the magnesium-containing example.

The invention claimed is:

1. An emission treatment system for treating a flow of a combustion exhaust gas comprising:
    a lean-burn diesel engine;
    a catalyst for treating emissions from the lean-burn diesel engine comprising a first layer having:
        a support material containing alumina or a mixed oxide containing alumina;
        a mixture or alloy of platinum and palladium disposed on the support material; and,
        a NOx storage material which consists of lanthanum-doped ceria and comprises 1.0-15 mol % lanthanum; and,
    a selective catalytic reduction catalyst system or a selective catalytic reduction filter system located downstream of the catalyst;
    wherein the lean-burn diesel engine is in fluid communication with the catalyst;
    wherein the first layer does not comprise rhodium.

2. The emission treatment system of claim 1, wherein the NOx storage material comprises 2.0-14 mol % lanthanum.

3. The emission treatment system of claim 1, wherein the NOx storage material is substantially free of barium.

4. The emission treatment system of claim 1, wherein the first layer is substantially free of alkali metals.

5. The emission treatment system of claim 1, wherein the first layer is substantially free of molecular sieves.

6. The emission treatment system of claim 1, wherein the first layer is substantially free of dysprosium (Dy), erbium (Er), europium (Eu), gadolinium (Gd), holmium (Ho), lutetium (Lu), neodymium (Nd), praseodymium (Pr), promethium (Pm), samarium (Sm), scandium (Sc), terbium (Tb), thulium (Tm), ytterbium (Yb) and yttrium (Y).

7. The emission treatment system of claim 1 further comprising a metal or ceramic substrate and wherein said catalyst is disposed on said substrate or is extruded to form said substrate.

8. The emission treatment system of claim 7, wherein the substrate is a flow-through monolith or a filter monolith.

9. A method of treating an exhaust gas from a lean-burn diesel engine comprising contacting the exhaust gas with the emission treatment system according to claim 1, wherein the exhaust gas is at a temperature of 180 to 300° C.

10. A catalyst for treating emissions from a lean-burn diesel engine comprising a first layer having:
    a support material containing alumina or a mixed oxide containing alumina;
    a mixture or alloy of platinum and palladium disposed on the support material;
    and a NOx storage material which consists of lanthanum-doped ceria and comprises 1.0-15 mol % lanthanum;
    wherein the first layer does not comprise rhodium.

11. The catalyst of claim 10, wherein the NOx storage material comprises 2.0-14 MORO lanthanum.

12. The catalyst of claim 10, wherein the NOx storage material is substantially free of barium.

13. The catalyst of claim 10, wherein the first layer is substantially free of alkali metals.

14. The catalyst of claim 10, wherein the first layer is substantially free of molecular sieves.

15. The catalyst of claim 10, wherein the first layer is substantially free of dysprosium (Dy), erbium (Er), europium (Eu), gadolinium (Gd), holmium (Ho), lutetium (Lu), neodymium (Nd), praseodymium (Pr), promethium (Pm), samarium (Sm), scandium (Sc), terbium (Tb), thulium (Tm), ytterbium (Yb) and yttrium (Y).

16. A catalyst article for absorbing NOx comprising a metal or ceramic substrate and a catalyst according to claim 10, wherein said catalyst is disposed on the substrate or is extruded to form the substrate.

17. The catalyst article of claim 16, wherein the substrate is a flow-through monolith or a filter monolith.

18. An emission treatment system for treating a flow of a combustion exhaust gas comprising a lean-burn diesel engine and the catalyst of claim 10;
wherein the lean-burn diesel engine is in fluid communication with the catalyst.

19. The emission treatment system of claim 18, further comprising one or more of a selective catalytic reduction catalyst system, a particulate filter, a selective catalytic reduction filter system, a passive NOx adsorber, and a three-way catalyst system.

20. A method of treating an exhaust gas from an internal combustion engine comprising contacting the exhaust gas with the catalyst of claim 10, wherein the exhaust gas is at a temperature of 180 to 300° C.

* * * * *